(12) United States Patent
Centonza et al.

(10) Patent No.: US 9,794,970 B2
(45) Date of Patent: *Oct. 17, 2017

(54) DECENTRALIZING CORE NETWORK FUNCTIONALITIES

(71) Applicant: Nokia Solutions and Networks Oy, Espoo (FI)

(72) Inventors: Angelo Centonza, Winchester (GB); Alan Ford, Southampton (GB); Matti Tapani Kiiski, Oulunsalo (FI); Matti Einari Laitila, Oulu (FI); Juergen Michel, Munich (DE); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,636

(22) Filed: Sep. 26, 2016

(65) Prior Publication Data
US 2017/0013652 A1    Jan. 12, 2017

Related U.S. Application Data

(63) Continuation of application No. 14/102,683, filed on Dec. 11, 2013, now Pat. No. 9,491,789, which is a (Continued)

(30) Foreign Application Priority Data

Apr. 29, 2008  (EP) ..................... 08008200

(51) Int. Cl.
*H04W 76/02* (2009.01)
*H04L 12/28* (2006.01)
(Continued)

(52) U.S. Cl.
CPC ....... *H04W 76/021* (2013.01); *H04L 12/2856* (2013.01); *H04L 29/12339* (2013.01);
(Continued)

(58) Field of Classification Search
CPC ........... H04L 29/12339; H04L 12/2856; H04L 61/2503; H04L 61/6077; H04L 29/12952; H04W 8/26; H04W 76/021
See application file for complete search history.

(56) References Cited

U.S. PATENT DOCUMENTS 6,295,457 B1    9/2001  Narayanaswamy
6,931,018 B1    8/2005  Fisher
(Continued)

FOREIGN PATENT DOCUMENTS

CN    1491004 A    4/2004
CN    1625117 A    6/2005
(Continued)

OTHER PUBLICATIONS

Min Kyu Han et al.: A Framework for Seamless Information Retrieval between an EPC Network and a Mobile RFID Network, IEEE, 2006, http://rfidlab.iecs.fcu.edu.tw/RFID/Papers/M9900179-1.pdf.
(Continued)

*Primary Examiner* — Jung-Jen Liu
(74) *Attorney, Agent, or Firm* — Harrington & Smith

(57) ABSTRACT

The present invention relates to methods and apparatuses for providing network access, wherein a connection to a core network is established via a wireless access device and a gateway device. Connectivity of the wireless access device is restricted to a pre-defined group of core network address of a pool of gateway devices with multi-node connectivity to the core network, and a single address is selected to establish the connection to a one of the gateway devices. The gateway
(Continued)

device is provided with a relay function for mapping a single input address to a plurality of core network addresses based on a location information of the wireless access device and with at least one co-located decentralized core network functionality.

20 Claims, 4 Drawing Sheets

Related U.S. Application Data continuation of application No. 12/989,861, filed as application No. PCT/EP2009/003085 on Apr. 28, 2009, now Pat. No. 8,654,709.

(51) Int. Cl.
*H04L 29/12* (2006.01)
*H04W 8/26* (2009.01)
*H04W 40/22* (2009.01)

(52) U.S. Cl.
CPC ......... *H04L 61/2503* (2013.01); *H04W 8/26* (2013.01); *H04W 40/22* (2013.01); *H04L 29/12952* (2013.01); *H04L 61/6077* (2013.01)

(56) References Cited

U.S. PATENT DOCUMENTS

| | | | |
|---|---|---|---|
| 9,491,789 B2* | 11/2016 | Centonza | H04L 12/2856 |
| 2003/0018872 A1 | 1/2003 | Blackmore et al. | |
| 2004/0120296 A1 | 6/2004 | Lee et al. | |
| 2007/0230474 A1 | 10/2007 | Culli et al. | |
| 2009/0232019 A1* | 9/2009 | Gupta | H04L 12/287 370/252 |
| 2009/0265543 A1 | 10/2009 | Khetawat et al. | |
| 2010/0195621 A1* | 8/2010 | Kekki | H04W 48/17 370/332 |
| 2010/0322128 A1* | 12/2010 | Becker | H04W 4/08 370/312 |

FOREIGN PATENT DOCUMENTS

| | | |
|---|---|---|
| CN | 1960566 A | 9/2007 |
| CN | 101052201 A | 10/2007 |
| EP | 1073244 A1 | 1/2001 |
| EP | 1548902 A2 | 6/2005 |
| EP | 1914930 A1 | 4/2008 |
| JP | 2005020482 A | 1/2005 |
| KR | 20040056486 A | 7/2004 |
| WO | WO 9937112 A1 | 7/1999 |
| WO | WO 9917506 A2 | 8/1999 |
| WO | WO 0051274 A1 | 8/2000 |
| WO | WO 03049490 A1 | 6/2003 |
| WO | WO 2004030434 A2 | 4/2004 |
| WO | WO 2007121787 A1 | 11/2007 |
| WO | WO 2009132824 A2 | 5/2009 |

OTHER PUBLICATIONS

Nokia Siemens Networks et al.: HeNB's S1 simplification by means of HeNB GW R3-080155, 3GPP, Feb. 11, 2008, URL http://www.3gpp.org/FTP/tsg_ran/WG3_Iu/TSGR3_59/docs/R3-080155.zip.
Alcatel-Lucent: "E-UTRAN architecture for the Home eNode B" R3-080671, 3GPP, Mar. 31, 2008, URL http://www.3gpp.org/FTP/tsg_ran/WG3_Iu/TSGR3_59bis/docs/R3-080671.zip.
Nokia Siemens Networks et al.: "Impact on S1AP from HeNB GW concept", R3-080465, 3GPP, Feb. 11, 2008, URL http://www.3gpp.org/FTP/tsg_ran/WG3_Iu/TSGR3_59/docs/R3-080465.zip.
3GPP TS 23.402 V8.4.0 (Dec. 2007), 3rd Generation Partnership Project; Technical Specification Group Services and System Aspects; Architecture Enhancements for Non-3GPP Accesses (Release 8), 131 pgs.
R3-080775; Vodafone Group, 3G Home NB Architecture Discussion:, 3GPP TSG RAN3 #59bis, Shenzhen, China, Mar. 31-Apr. 4, 2008.
R3-080351; Huawei, Discussion on 3G HNB Architecture, 3GPP TSG RAN WG3 Meeting #59, Sorrento, Italy, Feb. 11-15, 2008.
Hannes Ekström et al Technical Solutions for the 3G Long-Term Evolution; IEEE 2006; Communications Maganzine.

* cited by examiner

DECENTRALIZING CORE NETWORK FUNCTIONALITIES

CROSS REFERENCE TO RELATED APPLICATIONS

This US Patent Application is a continuation of copending U.S. patent application Ser. No. 14/102,683, filed Dec. 11, 2013, which is a continuation of U.S. patent application Ser. No. 12/989,861, filed Feb. 28, 2011, now U.S. Pat. No. 8,654,709 B2, issued Feb. 18, 2014, which is a national stage application of International Application No. PCT/EP2009/003085, filed Apr. 28, 2009, all of which are hereby incorporated by reference in their entireties.

FIELD OF THE INVENTION

The present invention relates to methods and apparatuses for network access to a wireless network, such as—but not limited to—Universal Mobile Communication System (UMTS) or Long Term Evolution (LTE) networks.

BACKGROUND OF THE INVENTION

Home base stations, home NodeBs, femto eNodeBs or any other type of home access device (in the following referred to as "HeNB") have become a widely discussed topic within 3$^{rd}$ Generation Partnership Project (3GPP) as well as in the operator and manufacturer community. When deployed in homes and offices, HeNBs allow subscribers to use their existing handsets—in a building—with significantly improved coverage and increased broadband wireless performance. Moreover, Internet Protocol (IP) based architecture allows deployment and management in virtually any environment with broadband Internet service.

With the introduction of High Speed Downlink Packet Access (HSDPA) in various commercial networks, operators noticed quite substantial date rate, i.e. capacity, consumption of single users. Those are in most cases users staying at home and using a HSDPA data card or the like for substantial Internet surfing like downloading movies etc. However, existing mobile communication systems (e.g. Global System for Mobile communications (GSM), Wideband Code Division Multiple Access (WCDMA/HSDPA) are not optimal suited for such home-based application, as those were developed and defined under the assumption of coordinated network deployment, whereas HeNBs are typically associated with uncoordinated and large scale deployment.

In HeNB scenarios, it is generally assumed that an end user is buying a cheap (Wireless Local Area Network (WLAN) like) product and also installs this physical entity at his home. Such a HeNB would then provide coverage/service to the terminals registered by the owner of the HeNB. Still the HeNB would use the same spectrum owned by the operator and as such at least partly the spectrum the operator is using to provide macro cell coverage to the area where the HeNB is located in.

Moreover, sharing and pooling properties of the core network, where several operator's core networks are attached to the same access node or foreign mobile terminal devices or user equipments (UEs) roam into a HeNB nominally "owned" by a certain operator, should be hidden to the HeNB, in order to ease handling of the HeNB. In general, conventional access devices, such as NodeBs or eNodeBs, being function-wise similar to HeNBs, bear a lot of nodal functions which are not necessary for simple home operation.

It has recently emerged that operators are interested in a so called local break-out (LBO) of "bulk" traffic. LBO is to be understood as a delivery of Internet traffic (or other bulk traffic) in a way that it does not transit across the operator's EPC, i.e. the Internet traffic would be forwarded to and received from the Internet via a gateway local to the base station without having to transit through the operator's core network nodes. LBO could also apply to voice traffic between two user equipments (UEs) in the same local area service area, where a local area service is a region in which local services adopting LBO can be deployed.

The deployment of HeNBs in LTE will have a strong impact on scalability at the EPC due to the very large deployment scale and therefore high numbers of interfaces to be established between HeNBs and EPC. Also, such deployment will cause an increase in the cost of operation and maintenance (O&M) operations as the O&M network will have to provide monitoring and control of all HeNBs.

However, current LTE standard specifications allow traffic breakout towards the public IP network only via a so called Public Domain Network Gateway (PDN GW). This configuration does not allow to offload traffic relative to Internet services from the centralized EPC, putting constraints on the EPC capacity and causing an increase of cost per bit of information traveling across the EPC.

SUMMARY

It is an object of the present invention to enable LBO of bulk traffic in wireless access network architectures.

This object is achieved by a method of providing network access, said method comprising:
 establishing a connection to a core network via a wireless access device;
 restricting connectivity of said wireless access device to a pre-defined group of core network address of a pool of gateway devices with multi-node connectivity to said core network; and
 selecting a single address to establish said connection to one of said gateway devices.

Furthermore, the above object is achieved, by a method of providing network access, said method comprising:
 using a gateway device for establishing a connection from a wireless access device to a core network;
 providing said gateway device with a relay function for mapping a single input address to a plurality of core network addresses based on a location information of said wireless access device; and
 decentralizing at least one core network functionality and co-locating it with said gateway device.

Additionally, the above object is achieved by an apparatus for providing access to a core network, said apparatus comprising:
 connecting means which provide a connectivity restricted to a pre-defined group of core network address of a pool of gateway devices with multi-node connectivity to said core network; and
 selecting means for selecting a single address from said group of core network addresses to establish a connection to a one of said gateway devices.

Finally, the above object is achieved by an apparatus for establishing a connection from a wireless access device to a core network, comprising:
 relay means for mapping a single input address to a plurality of core network addresses based on a location information of said wireless access device; and at least one co-located decentralized core network functionality.

Accordingly, two deployment concepts of gateway device and decentralized core network functionality (enabling e.g. LBO) are linked and solutions are proposed for scenarios in which the gateway device and the core network functionality (e.g. the LBO gateway or gateway function) can be joint together in or at the same node.

A clear advantage of the proposed solution is that it allows local breakout of bulk Internet traffic at a point local to the wireless access devices, i.e. it allows Internet traffic not to be routed through the central core network, hence reducing the cost per bit of information delivered to/from the user. This differentiation of "bulk traffic" enables local peer-to-peer routing and optimized user data routing to packet data networks (e.g. the Internet) without passing centralized cellular gateways on the core network. Now, local traffic can be kept within the local area and also operator's core networks become off-loaded from bulk traffic that is out of quality of service (QoS) control and charging (due to an applied flat rate).

The proposed pool of gateway devices provides the additional advantage that the load can be distributed more homogeneously across a predefined pool of neighbour gateway devices, e.g., across secondary gateways. Thereby, single point of failure problems concerning failures of gateway devices (independently of the core network functionalities collocated with it) can be overcome.

Due to restricted single-node connectivity of the wireless access device (e.g. HeNB), multi-node functionalities, like network node selection function (NNSF) and multi-core-network-node connectivity, can be removed from and completely located outside the wireless access network. They can be centralized at the gateway node between the wireless access network and the core network, e.g. an evolved packet core (EPC). Thereby, access device functions (e.g. LTE eNB S1 functions and the like) can be simplified.

The proposed incorporation of core network functionalities in the gateway device thus allows LBO without forcing the "bulk" Internet traffic to flow through the core network. Moreover, the problem of gateway recovery in cases where such node is also used for LBO can be solved.

Moreover, efforts in manufacturing, deployment, configuration, operation and maintenance of the wireless access devices can be reduced. Providing parts of the access node functions in a network equipment external to the wireless access node circumvents complexity of all mentioned aspects. Furthermore, in mass deployment, this is advantageous due to lower production costs, lower operational costs and simpler handling of connectivity towards the core network.

Traffic exchanged by terminal devices served within the gateway domain can be routed without involving the central core network, i.e. U-Plane traffic routes within a gateway domain will go from one peer terminal device to the other peer terminal device passing through the gateway device.

This allows to reduce the complexity of the gateway device, which is important due to the relatively high number of gateway devices operators may have to deploy if very high volumes of wireless access devices need to be achieved.

A user-plane connection may be established to the gateway device via a single Internet Protocol address. Additionally, a control-plane connection may be established to the gateway device via a single transmission protocol association containing a single transmission protocol stream and a single Internet Protocol address. The cell of the wireless access device may be established as a closed subscriber group cell identified by a tracking area identifier.

The gateway device may provide connections to the core network via several Internet Protocol addresses and several transmission protocol streams. An automatic setup of the gateway device with a pre-defined identification. The pre-defined identification may comprise a tracking area with at least one dedicated tracking area code.

According to first options, the at least one core network functionality may comprises at least one of a serving gateway functionality, a packet data network gateway functionality, a mobility management functionality, so that at least one of a user plane and a control plane of said connection is terminated at said gateway device. As a specific example, the mobility management functionality may be part of a pool of mobility management entities local to the gateway device. According to another example, a default bearer may be provided for traffic terminated at said gateway device.

This enables a more synchronised and easy to manage procedure for bearer monitoring and control and U-Plane traffic mapping into radio bearers. Obviously, more functions will need to be supported by the HeNB GW.

The proposed at least one core network functionality may be used to provide local routing without passing a centralized gateway device at the core network. In a specific example, the local routing may comprise at least one of local peer-to-peer routing and local routing to an external packet data network (e.g. the Internet). In this way LBO for Internet traffic could happen at the HeNB GW without forcing collocation of an S-GW in it. This would make the HeNB GW more cost effective, still improving the cost per bit of information travelling across the centralized EPC.

According to a second option, the at least one core network functionality may comprise a control plane anchor function for the wireless access device, so that the user plane of the connection is terminated at said wireless access device.

In this way there is no need to place the Operator owned HeNB GW in the private premises without impacting the possibility for the operator to manage HeNBs and fully control the consumed LBO services. Also the LBO traffic on the U-plane is kept within the local intranet e.g. safely behind the firewall.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on exemplary and non-limiting LTE network architectures.

Figure 1:
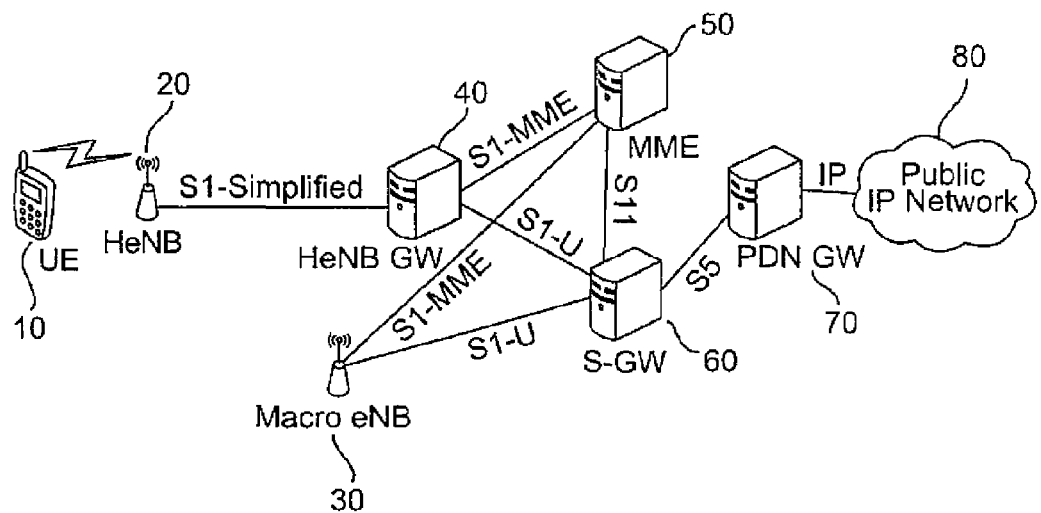
FIG. 1 shows a schematic network architecture with a HeNB gateway support.

FIG. 1 shows a schematic network architecture with a HeNB gateway in a non-network sharing case according to a first embodiment.

According to FIG. 1, a Home eNodeBs (HeNB) 20 with reduced functionality is provided in a subscriber home environment, e.g. within a building, to provide wireless access for a user equipment (UE) 10, and is connected to a HeNB gateway (node) 40. The HeNB gateway 40 provides connection via an S1-MME reference point to a mobility management entity (MME) 50 or a pool thereof and via an S1-U reference point to a signaling gateway (S-GW) 60 or a pool thereof. Both MME 50 and S-GW 60 provide connections to a macro eNB 30 which serves a macro cell in or under which the HeNB 20 located. The protocol over the S1-MME reference point can be enhanced Radio Access Network Application (eRANAP) and may use Stream Control Transmission Protocol (SCTP) as the transport protocol. The S1-U reference point can be used for per-bearer user plane tunneling and inter-eNB path switching during handover. The transport protocol over this interface may be General Packet Radio Services (GPRS) tunneling protocol—user plane (GTP-U). The S-GW 60 provides an S5 interface to a packet data node gateway (PDN GW) 70 which is adapted to establish an IP connection to a public IP network 80.

The MME 50 manages mobility, UE identities and security parameters. The core network functionalities of the MME 50 include at least some of non-access stratum (NAS) signaling and related security, inter core network node signaling for mobility between access network, idle mode UE tracking and reachability (including control and execution of paging retransmission), roaming, authentication, and bearer management functions including dedicated bearer establishment.

The S-GW 60 is the node that terminates the interface towards the wireless access network (e.g. EUTRAN). For each UE 10 associated with an evolved packet service, at a given point of time, there may be one single S-GW. The core network functionalities of the S-GW 60 include at least some of local mobility anchor point for inter-eNB handover, mobility anchoring for inter-3GPP mobility, EUTRAN idle mode downlink packet buffering and initiation of network triggered service request procedure, lawful interception, and packet routing and forwarding.

Furthermore, the PDN GW 70 is the node that terminates the SGi interface towards the packet data network (PDN), e.g. the Public IP network 80. If the UE 10 is accessing multiple PDNs, there may be more than one PDN GW for that UE 10. The core network functionalities of the PDN GW 70 include at least some of mobility anchor for mobility between 3GPP access systems and non-3GPP access systems (which is sometimes referred to as the system architecture evolution (SAE) anchor function), policy enforcement, per-user based packet filtering (by e.g. deep packet inspection), charging support, lawful Interception, UE IP address allocation, and packet screening.

According to the architecture of FIG. 1, standard functionality, such as for example, NNSF and multi-CN-node connectivity is located outside the HeNB 20 and is now centralized in the HeNB gateway 40 between the HeNB 20 and the core network (e.g. EPC (Evolved Packet Core)).

The following simplifications can be introduced in the proposed HeNB architecture, in favour of the proposed introduction of the HeNB gateway 20.

As to its control plane functionality, the connectivity of the HeNB 20 can be restricted to connect (at least logically) to a single core network node, i.e. the pooling property of the control plane of the core network should be transparent to the HeNB 20; This eases configuration setup of the HeNB 20 and handling of connectivity towards the core network within the HeNB 20. as an example, the HeNB 20 may connect to the core network via a single SCTP association containing a single SCTP stream and a single IP address (i.e. no IP multihoming). This is different to the S1-C property of the macro eNB 40, where common S1AP procedures are handled via a separated SCTP stream and dedicated S1AP procedures via a few SCTP streams.

It is noted that a single SCTP stream is usually not used to map 1:1 to a UE dedicated connection, IDs generated by the application part shall be used to establish UE dedicated S1 signaling relations between UE dedicated contexts located in the MME (pool) 50 and the eNB 30.

Consequently, the HeNB 20 connects control-plane-wise only to a single network node of the core network and does not contain any NNSF (S1-flex) function. This function is now located in the HeNB gateway 40.

As to its user plane functionality, the HeNB 20 connects to the core network via a single IP address. Handling of tunnel endpoint identifiers (TEIDs) can take place without specific requirements for uplink (UL) traffic (e.g. the TEID can be allocated by the EPC's S-GWs 321 to 323).

Furthermore, the HeNB 20 can be logically connected to the same MME 50, which serves the macro layer as well. By this measure, unnecessary mobility actions (e.g. inter-MME pool handover (HO) at the HeNB 120 or HO scenarios at the macro eNB 30) of the HeNB gateway 40 might be restricted to a certain geographical area, corresponding to an MME (pool) area.

The HeNB gateway 40 can be adapted to relate the location of the HeNB 20 with the MME 50 serving the eNB 30 that provides the macro cell under which the respective HeNB is located. In this manner it avoids inter-MME handovers (HOs).

As to its control plane functionality, the HeNB gateway 40 holds information about connectivity to various operators' core networks (e.g. MME pools). In order to enable S1-flex connectivity for the HeNB 20, without deploying and configuring the HeNB 20 with this functionality, the HeNB gateway 40 may provide a 1:n relay functionality. This can be based on the provision of global node-ID's on S1AP protocol level. Hence, the HeNB gateway 40 acts—in principle—similar to a (macro) eNB towards the core network, i.e., it performs automatic registration towards (a pool of) MME entities. A specific tracking area identity or identification (which may consist of a tracking area code (TAC) out of a range of specific TACs, indicating a closed subscriber group (CSG) and/or a home access) indicated during an automatic setup could indicate the specific property of the HeNB gateway 40.

The HeNB gateway 40 can be connected via several IP addresses (IP multihoming) and at least several SCTP streams (on dedicated or common signaling). Connectivity between the HeNB 20 and the HeNB gateway 40 can be established on demand and this might change dependent on the activity of a HeNB or users choice. This dynamic connectivity-behaviour, which may be more dynamic than from the macro eNB 30 can be transparent to the core network.

Thus, the HeNB gateway 40 acts towards the HeNB 20 as a single core network node, and towards the core network as a single eNB. As already mentioned, the HeNB gateway 40, acting as an eNB towards a core network node might necessitate to itself at automatic S1 setup with a specific identification, e.g. a tracking area with a specific tracking area code (a single specific one or out of a set of dedicated "home" Tracking Area Codes). This information can be provided on the HeNB broadcast channel.

Additionally, the HeNB gateway 40 may hold (store) at least one mapping table to translate the location information provided by the HeNB 20 to an MME-pool connectivity information, e.g., not only of the "owning" operator but also of foreign-operators. Thereby, the HeNB gateway 40 can relay HO messages from/to the HeNB 20 to the macro eNB 30, with corresponding translation of identifiers, if needed.

As to its user plane functionality, the HeNB gateway 40 translates (DL) tunnel endpoint identifiers (TEIDs) allocated by the HeNB 20, as the HeNB gateway 40 acts as a single node and the ranges selected by the HeNB 20 may overlap (depending on implementation specifics). Another alternative could be to coordinate/control TEID assignment by the core network, and signal towards the HeNB 20 the range of (DL) TEIDs it is allowed to allocate at setup.

Figure 2:
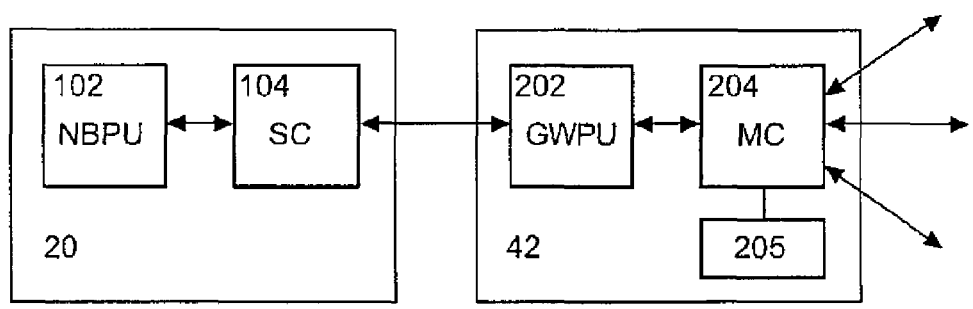
FIG. 2 shows a schematic block diagram of a HeNB and a HeNB gateway according to various embodiments

FIG. 2 shows a schematic block diagram of a HeNB 10 and a HeNB gateway 42 according to various embodiments.

The HeNB 20 comprises a NodeB processing unit (NBPU) 102 for performing NodeB-related signal and control processing with the restrictions according to the embodiments described herein. The NBPU 102 may be implemented as a software controlled central processing unit (CPU) or any other processor device. Furthermore, the HeNB 20 comprises a single-connectivity unit (SC) 104 which is controlled by the NBPU 102 and which is configured to restrict the connectivity of the HeNB 20 to a single core network connection towards the HeNB gateway 42, which can be selected from a group of core network addresses of a pool of HeNB gateway devices, as explained later in more detail. The SC 104 may be implemented as a subroutine which controls the NBPU 102 or as a separate software-controlled CPU or any other processor device.

Furthermore, according to FIG. 2, a HeNB gateway 42 comprises a gateway processing unit (GWPU) 202 for performing the above mentioned multi-node related signal and control processing extracted from conventional eNBs. The GWPU 202 may be implemented as a software controlled central processing unit (CPU) or any other processor device. Furthermore, the HeNB gateway 42 comprises a multi-connectivity unit (MC) 204 which is controlled by the GWPU 202 and which is configured to provide the above mentioned 1:n relay functionality. Mapping of addresses, locations, or IDs can be achieved by a memory or look-up table (LUT) (not shown) which stores corresponding mapping table(s). The MC 204 may be implemented as a subroutine which controls the GWPU 202 or as a separate software-controlled CPU or any other processor device.

Additionally, the HeNB gateway 42 according to FIG. 2 comprises a collocated decentralized core network component, unit, or functionality 205 which enables decentralization of core network (e.g. EPC) functionalities, so that the HeNB gateway 42 can also be used for serving macro eNBs or any type of access device within the local area served by the HeNB gateway 42.

In the exemplary following embodiments, a few possible architecture options achievable for LBO in the HeNB gateway are described in connection with first to sixth embodiments.

Figure 3:
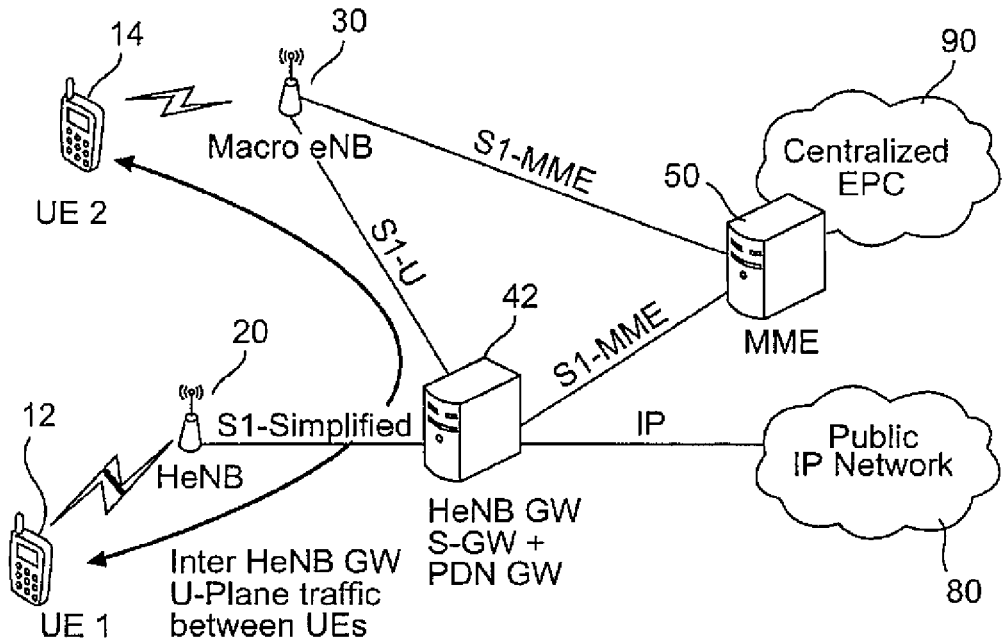
FIG. 3 shows a schematic network architecture with a HeNB gateway support incorporating several gateway functionalities according to a first embodiment.

FIG. 3 shows a schematic network architecture with a HeNB gateway support incorporating several gateway functionalities according to a first embodiment, where the HeNB GW 42 also incorporates a S-GW functionality and a PDN GW functionality in its core network functionality 205 of FIG. 2. In this architecture the U-plane terminates at the HeNB GW 42, so that bearers can be established with the HeNB GW 42 without the need of terminating at the centralized EPC 90, and an LBO functionality to the public IP network 80 can be achieved at the HeNB GW 42. On top of the LBO for Internet traffic a further advantage is that traffic exchanged by UEs served within the HeNB GW domain can be routed without involving the central EPC, i.e. user plane (U-plane) traffic routes within a HeNB GW domain will go from one peer UE to the other peer UE passing through the HeNB GW as shown in FIG. 3. In the architecture shown in FIG. 3, the control plane (C-plane) signaling is still forwarded to the MME 50 in the centralized EPC 90. This allows to reduce the complexity of the HeNB GW 42, which is important due to the relatively high number of HeNB GWs the operators will have to deploy if very high volumes of HeNBs need to be achieved. The U-plane and the C-plane are decoupled from each other, the first terminating at the HeNB GW 42 and the latter terminating at the EPC 90. Thus, in FIG. 4, a peer to peer traffic route between UEs 12, 14 in the same HeNB GW domain is achievable without involving the EPC 90.

Figure 4:
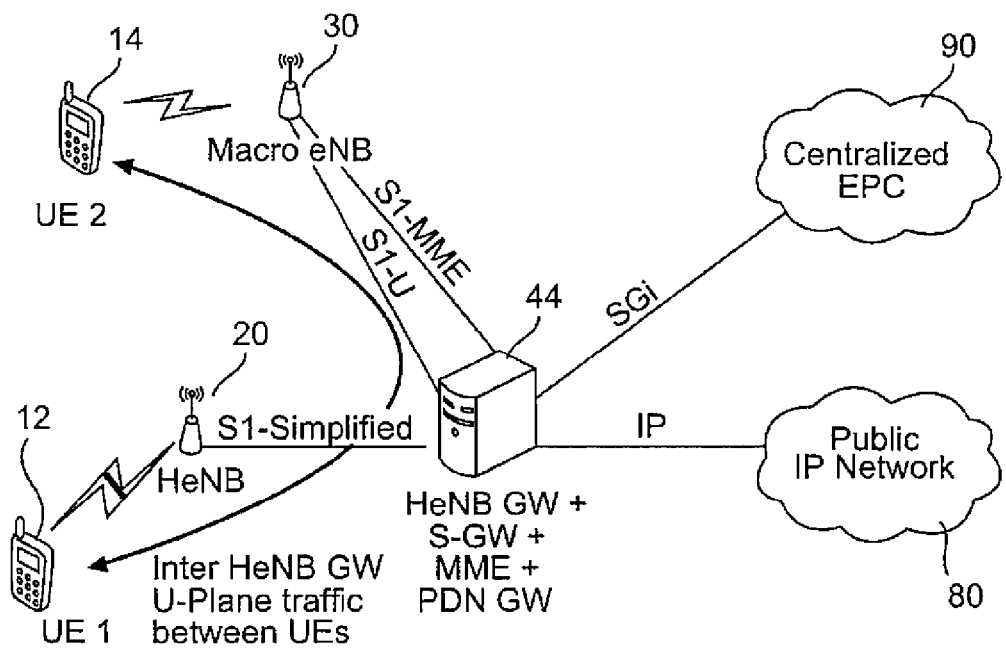
FIG. 4 shows a schematic network architecture with a HeNB gateway support incorporating several gateway functionalities according to a second embodiment.

FIG. 4 shows a schematic network architecture with a HeNB gateway support incorporating several gateway functionalities according to a second embodiment. In this alternative architecture, a HeNB GW 44 is provided which also includes an MME functionality in its core network functionality. In this architecture the U-plane and the C-plane for UEs connected to base stations within the HeNB GW pool terminate locally at the HeNB GW 44. This enables a more synchronized and easy to manage procedure for bearer monitoring and C- and U-plane traffic mapping into radio bearers.

It needs to be mentioned that the MME functionality in the HeNB GW 44 can be part of a pool. Such a pool could consist of MMEs local to the HeNB GW 44, i.e. either stand alone MMEs or MMEs incorporated in other HeNB GWs which are local to the concerned HeNB GW 44. It is also noted that the MME functionality incorporated in the HeNB GW 44 can be involved in the establishment of S1-MME interfaces with macro eNBs (e.g. macro eNB 30) in the local area and in the establishment of S1-MME with HeNB GWs that are either co-located with the MME functionality or that are in its same local area. In other words, the MME functionality co-located with the HeNB GW 44 does not establish a direct S1-MME interface with the HeNBs in the local area. The HeNB 20 may only establish a simplified S1 interface with the HeNB GW 44. In FIG. 4, the peer to peer traffic route between UEs 12, 14 in the same HeNB GW domain is achievable without involving the EPC 90.

Figure 5:
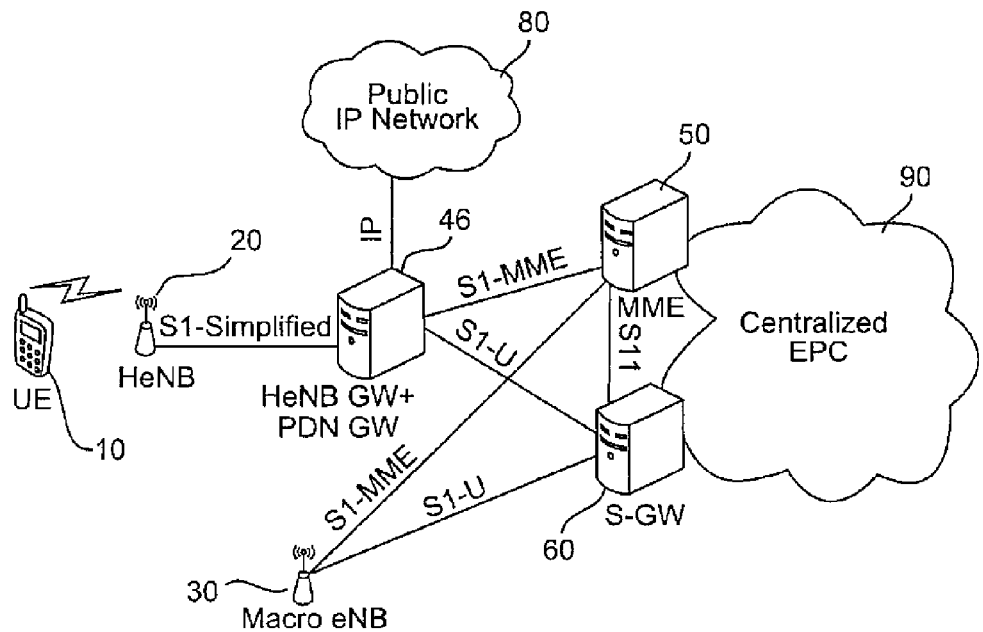
FIG. 5 shows a schematic network architecture with a HeNB gateway support incorporating a single PDN gateway functionality according to a third embodiment.

FIG. 5 shows a schematic network architecture with a HeNB gateway support incorporating a single PDN gateway functionality according to a third embodiment, where a HeNB GW 46 only includes a PDN GW functionality in its core network functionality. The solution envisaged in this scenario implies the termination of U-plane bearers for Internet traffic transport at the HeNB GW 46, so that the S-GW 60 is not involved in the establishment of U-plane bearers. This can be achieved e.g. by enabling a default bearer for Internet traffic with fixed quality of service (QoS) and that is terminated at the HeNB GW 46. In this way LBO for Internet traffic could happen at the HeNB GW 46 without forcing collocation of an S-GW functionality in it. This would make the HeNB GW 46 more cost effective, still improving the cost per bit of information traveling across the centralized EPC 90.

Figure 6:
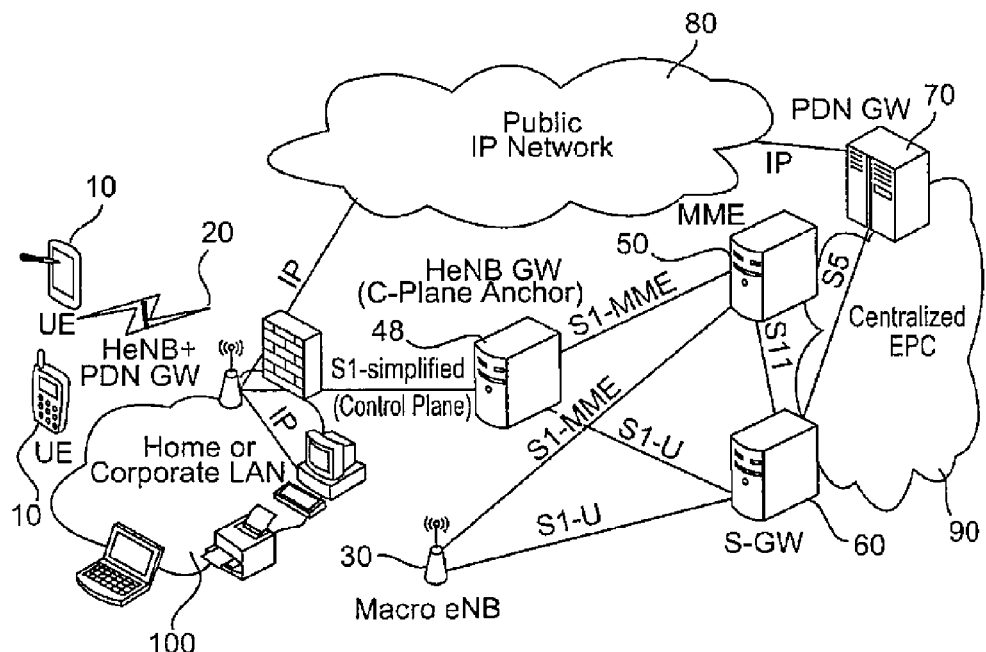
FIG. 6 shows a schematic network architecture with a HeNB gateway support incorporating a C plane anchor functionality according to a fourth embodiment.

FIG. 6 shows a schematic network architecture with a HeNB gateway support incorporating a C-plane anchor functionality according to a fourth embodiment, where the core network functionality of a HeNB GW 48 only includes C-plane anchor functionalities (e.g. address translation, binding etc.) for HeNBs 20 (or pico, micro eNBs) with integrated PDN GW functionality for providing direct LBO to a private local area network (LAN) 100, e.g., a home LAN, a corporate LAN, a campus or any type of intranet. The anchor functionality The solution envisaged in this scenario implies the termination of the U-plane bearers for local intranet level peering and Internet access with "native IP" traffic transport at the HeNB 20. Even the UE 10 will see this as a normal 3GPP compliant PDN connectivity associated with an access point name (APN) and related bearer(s). In this way there is no need to place the operator owned HeNB GW 48 in the private premises without impacting the possibility for the operator to manage the HeNBs 10 and fully control the consumed LBO services. Also the LBO traffic on the U-plane is kept within the local intranet e.g. safely behind the firewall.

In all the architecture scenarios described in connection with the above first to fourth embodiments, the HeNB GW constitutes a single point of failure. A solution is needed in order to provide service continuity to users in case of HeNB GW failure. A solution to this problem would consist of configuring each HeNB with a pool of HeNB GWs, so that in case of primary HeNB GW failure the HeNBs can randomly pick one of the secondary HeNB GWs configured, hence distributing the load more homogeneously across secondary HeNB GWs. Further, before connecting to a secondary HeNB GW, signaling messages could be exchanged between the HeNB and the secondary HeNB GW, in order to determine what the current load on the HeNB GW is, what the load the HeNB will generate (in terms of traffic) is and whether connection to the secondary GW is opportune and affordable.

Figure 7:
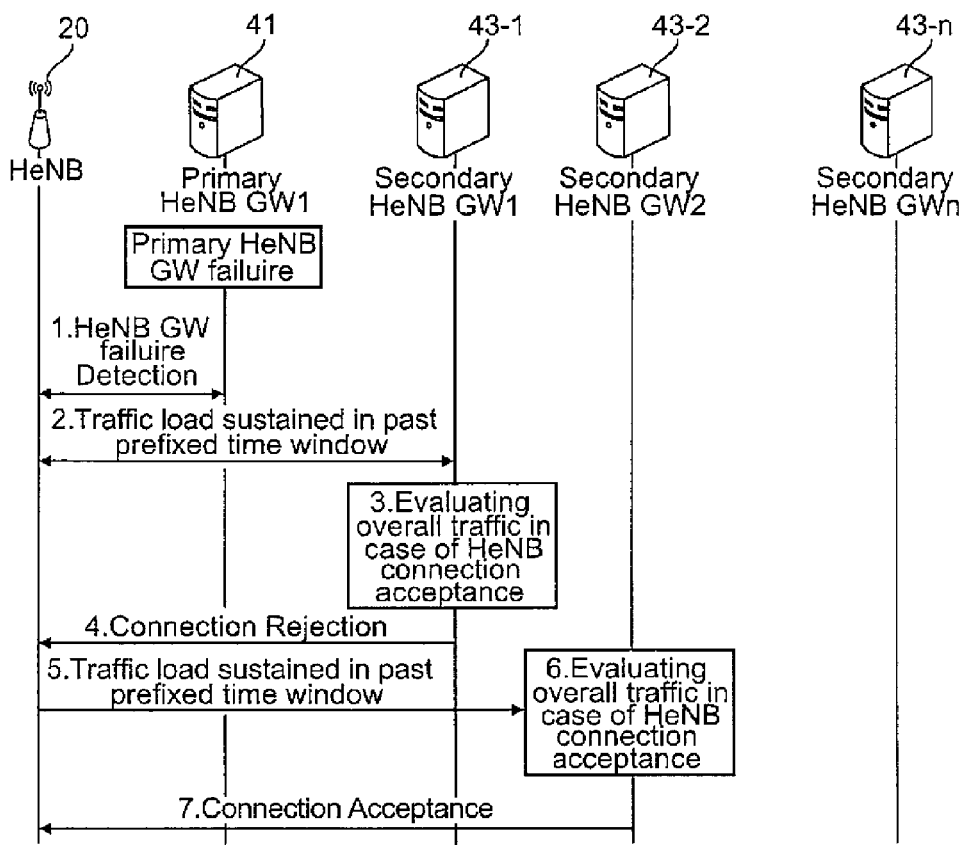
FIG. 7 shows a schematic processing and signaling diagram of a HeNB gateway reselection procedure according to a fifth embodiment.

FIG. 7 shows a schematic processing and signaling diagram of a HeNB gateway reselection procedure according to a fifth embodiment, where the HeNB 20 randomly tries to connect to one of a plurality of secondary HeNB GWs 43-1 to 43-n in his list and in order to do so it communicates the overall traffic load (uplink (UL) and/or downlink (DL)) experienced within a past time window. A selected secondary HeNB GW will first of all evaluate if it can sustain an extra S1-simplified connection and then it will assess if it is able to sustain the overall traffic obtained by adding the current traffic load with the traffic load communicated by the HeNB 20. If these two criteria are satisfied, the connection will be established, otherwise connection will be rejected and the HeNB 20 will try to connect to a different HeNB GW in the preconfigured pool of secondary GWs 43-1 to 43-n.

In the exemplary scenario of FIG. 7, if a primary NeNB GW failure happens, this is detected at the HeNB 20 (step 1). Then, traffic load sustained in past prefixed time window is measured (step 2) and signaled to a selected or default first secondary NeNB GW1 43-1, evaluates in step 3 the overall traffic in case of a HeNB connection acceptance. It is assumed in the exemplary scenario that the first secondary HeNB GW1 43-1 rejects the connection in step 4. Then, in step 5, the traffic load sustained in the past prefixed time window is signaled to a second secondary HeNB GW2 43-2 which also evaluates overall traffic in case of HeNB connection acceptance (step 6). It is now assumed that the connection is accepted by the second secondary HeNB GW2 43-2, and connection acceptance is signaled to the HeNB 20 in step 7, so that the connection can be established via the second secondary HeNB GW2 43-2.

Figure 8:
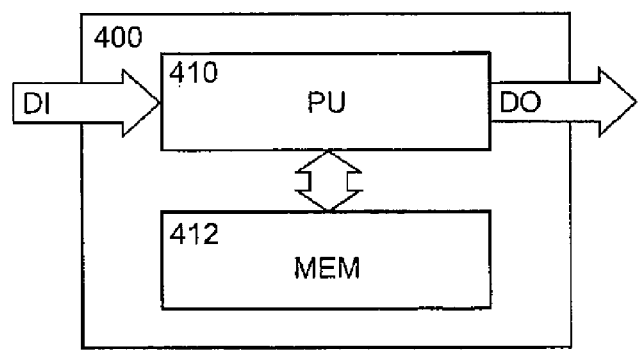
FIG. 8 shows a schematic block diagram of software-based implementation according to a sixth embodiment.

FIG. 8 shows a schematic block diagram of an alternative software-based implementation according to a sixth embodiment. The required functionalities can be implemented in any network entity (which may be provided in the HeNB 20 or the above HeNB gateways 41, 42, 43, 44, 46, or 48) with a processing unit 410, which may be any processor or computer device with a control unit which performs control based on software routines of a control program stored in a memory 412. The control program may also be stored separately on a computer-readable medium. Program code instructions are fetched from the memory 412 and are loaded to the control unit of the processing unit 410 in order to perform the processing steps of the above device-specific functionalities which may be implemented as the above mentioned software routines. The processing steps may be performed on the basis of input data DI and may generate output data DO. In case of the HeNB 20, the input data DI may correspond to a connection request for triggering a connection set-up, and the output data DO may correspond to a selected gateway address. In case of the HeNB gateway 41, 42, 43, 44, 46, or 48, the input data DI may correspond to request for LBO or another decentralized core network related procedare, and the output data DO may correspond to the signaling required for implementing the requested core network related functionality.

Consequently, the above embodiments of the HeNB and HeNB gateway may be implemented as a computer program product comprising code means for generating each individual step of the signaling procedures for the respective entity when run on a computer device or data processor of the respective entity at the HeNB 20 or the HeNB gateway 41, 42, 43, 44, 46, or 48 or any corresponding network entity.

The implementation of the above embodiments thus comprises decentralization of at least a part of the EPC functionalities and co-locating it with the HeNB GW. This is a new approach to decentralized architectures because the decentralization of EPC and the HeNB architectures have so far been seen as two separate problems and solutions addressing both issues at the same time have not yet been sought. Moreover, the advantage of the solutions presented above is that the enhanced HeNB GW containing elements of the EPC is no more used for serving only HeNBs, but it is used also for serving macro eNBs or any type of eNB within the local area served by the HeNB GW.

Other clear advantages of the above embodiments are that they allow local breakout of bulk Internet traffic at a point local to the base stations (e.g. HeNB or eNB), i.e. it allows Internet traffic not to be routed through the central EPC, hence reducing the cost per bit of information delivered to/from the user.

Also, the fifth embodiment may serve to overcome single point of failure problems concerning failures of HeNB GWs (independently of the EPC functionalities collocated with it). A homogeneous distribution of the HeNBs affected by a HeNB GW failure across a predefined pool of neighbour HeNB GWs is allowed.

In summary, a method, apparatus, and computer program product have been described, wherein a connection to a core network is established via a wireless access device and a gateway device. Connectivity of the wireless access device is restricted to a pre-defined group of core network address of a pool of gateway devices with multi-node connectivity to the core network, and a single address is selected to establish the connection to a one of the gateway devices. The gateway device is provided with a relay function for mapping a single input address to a plurality of core network addresses based on a location information of the wireless access device and with at least one co-located decentralized core network functionality.

It is apparent that the invention can easily be extended to any service and network environment and is not restricted to the LTE technology area and in particular not to home eNBs. The proposed embodiments can be implemented in connection with any base station with limited coverage (usually employed for indoor coverage and improved user experience in the home area) deployed in a wireless network. The embodiments may thus vary within the scope of the attached claims.

What is claimed is:

1. A method of providing network access, the method comprising:
   in a wireless access network associated with a core network;
   establishing a connection to the core network via a wireless access device in the wireless access network, wherein a user plane of the connection is terminated, without involving the core network, at the wireless access device or at a gateway device connected to the core network, a control plane of the connection is connected to the core network, and the user-plane connection is established using an Internet Protocol address.

2. A method of providing network access, the method comprising:
   in a wireless access network associated with a core network;
   using a gateway device for establishing a connection from a wireless access device to the core network;
   applying a relay function at the gateway device, wherein the relay function is configured to map an address of the wireless access device to a plurality of core network addresses of a pool of gateway devices connected to the core network;
   supporting decentralizing of at least one core network functionality and co-locating it with the gateway device; and
   terminating at least one of a user plane and a control plane of the connection, at at least one of the wireless access device and the gateway device using the at least one core network functionality.

3. The method according to claim 1, wherein the Internet Protocol address is the address of the gateway device.

4. The method according to claim 2, further comprising connecting the gateway device to the core network via one or more Internet Protocol addresses and/or one or more transmission protocol streams.

5. The method according to claim 1, further comprising establishing the control-plane connection to the gateway device via a single transmission protocol association containing a single transmission protocol stream and a single Internet Protocol address.

6. The method according to claim 1, further comprising performing automatic set-up of the gateway device with a pre-defined identification.

7. The method according to claim 6, wherein the pre-defined identification comprises a tracking area with at least one dedicated tracking area code.

8. The method according to claim 2, wherein the at least one core network functionality comprises at least one of a serving gateway functionality, a packet data network gateway functionality, a mobility management functionality, and a control plane anchor function, so that at least one of the user plane and the control plane of the connection is terminated at at least one of the wireless access device and the gateway device.

9. The method according to claim 8, wherein the mobility management functionality is part of a pool of mobility management entities local to the gateway device.

10. The method according to claim 2, further comprising using the at least one core network functionality to provide local routing without passing a centralized gateway device at the core network.

11. An apparatus for providing access to a core network, the apparatus comprising:
    connecting means for establishing a connection to the core network from the apparatus in a wireless access network associated with the core network, wherein a user plane of the connection is terminated at one of a pool of gateway devices connected to the core network without involving the core network, a control plane of the connection is connected to the core network, and if the user-plane connection is to be terminated at the one of the gateway devices of the pool of gateway devices, the user-plane connection is established using an Internet Protocol address.

12. The apparatus according to claim 11, wherein the connecting means is adapted to establish the control-plane connection to the one of the gateway devices of the pool of gateway devices via a single transmission protocol association containing a single transmission protocol stream and a single Internet Protocol address.

13. The method according to claim 11, wherein the Internet Protocol address is the address of the gateway device.

14. A wireless access device comprising an apparatus according to claim 11.

15. An apparatus for establishing a connection from a wireless access device in a wireless access network to an associated core network, the apparatus comprising:
    relay means for mapping an address of the wireless access device to a plurality of core network addresses of a pool of gateway devices connected to the core network;
    selecting means for selecting a single address from the plurality of core network addresses for the wireless access device; and
    gateway means for establishing a connection from the wireless access device to the core network via the selected single address.

16. The apparatus according to claim 15, wherein the apparatus comprising at least one co-located decentralized core network functionality, wherein at least one of a user plane and a control plane of the connection is terminated at the wireless access device or at the gateway means using the at least one co-located decentralized core network functionality.

17. The apparatus according to claim 15, wherein the relay means is configured to provide a connection to the core network via one or more Internet Protocol addresses and/or one or more transmission protocol streams.

18. The apparatus according to claim 15, wherein the relay means provides a logical signaling interface between the wireless access device and other wireless access devices or macro access devices which provide macro cells.

19. The apparatus according to claim 16, wherein the at least one core network functionality comprises at least one of a serving gateway functionality, a packet data network gateway functionality, a mobility management functionality, and a control plane anchor function, so that at least one of the user plane and the control plane of the connection is terminated at the gateway means.

20. The apparatus according to claim 16, wherein the apparatus is configured to use the at least one core network functionality to provide local routing without passing a centralized gateway device at the core network.

* * * * *